United States Patent
Thompson et al.

(10) Patent No.: US 8,239,059 B2
(45) Date of Patent: Aug. 7, 2012

(54) ACCESS RECORDS ON TAPE MEDIUM AUXILIARY MEMORY DEVICE

(75) Inventors: Nathan Christopher Thompson, Boulder, CO (US); Matthew Thomas Starr, Lafayette, CO (US); Michael Jerard Goberis, Broomfield, CO (US)

(73) Assignee: Spectra Logic Corp., Boulder, CO (US)

( * ) Notice: Subject to any disclaimer, the term of this patent is extended or adjusted under 35 U.S.C. 154(b) by 471 days.

(21) Appl. No.: 12/537,146

(22) Filed: Aug. 6, 2009

(65) Prior Publication Data

US 2009/0323218 A1 Dec. 31, 2009

Related U.S. Application Data (63) Continuation-in-part of application No. 11/927,032, filed on Oct. 29, 2007, now Pat. No. 8,082,058.

(51) Int. Cl.
*G11B 15/18* (2006.01)
*G11B 15/68* (2006.01)
*G11B 5/02* (2006.01)
*G11B 17/00* (2006.01)

(52) U.S. Cl. ............ 700/214; 360/69; 360/92.1; 360/25; 360/27; 360/72.2

(58) Field of Classification Search .................. None
See application file for complete search history.

(56) References Cited

U.S. PATENT DOCUMENTS

| | | | | |
|---|---|---|---|---|
| 5,826,104 | A * | 10/1998 | Rifkin ........................... | 710/15 |
| 6,425,042 | B1 | 7/2002 | Ikeda et al. | |
| 2001/0044877 | A1 | 11/2001 | Kanazawa et al. | |
| 2002/0118481 | A1 * | 8/2002 | Ingram ......................... | 360/69 |
| 2004/0105187 | A1 | 6/2004 | Woodruff et al. | |
| 2004/0223253 | A1 | 11/2004 | Woodruff et al. | |
| 2004/0264037 | A1 | 12/2004 | Downey et al. | |
| 2004/0264038 | A1 | 12/2004 | Heineman et al. | |
| 2004/0264039 | A1 | 12/2004 | Armagost et al. | |
| 2004/0264040 | A1 | 12/2004 | Armagost et al. | |
| 2004/0264041 | A1 | 12/2004 | Kumpon et al. | |
| 2004/0264042 | A1 | 12/2004 | Pollard et al. | |
| 2005/0007692 | A1 | 1/2005 | Thompson et al. | |
| 2005/0052772 | A1 * | 3/2005 | Barbian et al. ................. | 360/69 |
| 2005/0076070 | A1 | 4/2005 | Mikami | |
| 2006/0164928 | A1 | 7/2006 | Starr et al. | |
| 2007/0195447 | A1 | 8/2007 | Starr et al. | |
| 2007/0253088 | A1 * | 11/2007 | Clarke et al. ................. | 360/72.2 |

OTHER PUBLICATIONS

U.S. Appl. No. 11/412,565, filed Apr. 27, 2006, Starr et al.
The seventh edition of the *IBM TotalStorage LTO Ultrium Tape Drive SCSI Reference* (Jun. 2007).
The first edition of the *IBM Setup, Operation, and Service Guide to IBM TotalStorage 3580 Tape Drive Model L33/L3H, Reference* (Dec. 2004).

* cited by examiner

*Primary Examiner* — Gene Crawford
*Assistant Examiner* — Yolanda Jones
(74) *Attorney, Agent, or Firm* — Ken Altshuler (57) ABSTRACT

Described is a tape library which can generally include a tape drive, a tape cartridge that possesses a medium auxiliary memory device, a device for reading information retained on the medium auxiliary memory device and a program that runs on a processor capable of manipulating information received by the reading device. The tape cartridge's medium auxiliary memory device can contain at least one record of a previous access event, such as an approximate point in time when the tape cartridge is loaded in the tape drive. The program may be operable to determine how much time has elapsed from the access event. Knowledge of the elapsed time can, among other things, cause an action to be taken relative to the tape cartridge and/or the data thereon. A method of using the system is also described.

21 Claims, 12 Drawing Sheets

PRIOR ART

FIG. 1A

PRIOR ART

ACCESS RECORDS ON TAPE MEDIUM AUXILIARY MEMORY DEVICE

CROSS-REFERENCE TO RELATED APPLICATIONS

This application is a continuation in part of U.S. Ser. No. 11/927,032, filed Oct. 29, 2007, the entire disclosure of which is incorporated herein by reference.

BACKGROUND OF THE INVENTION

1. Field of the Invention

The present invention relates generally to tape libraries using auxiliary memory devices contained in tape storage cartridges to maintain a record of access events when loaded in a tape drive.

2. Description of Related Art

Figure 1A:
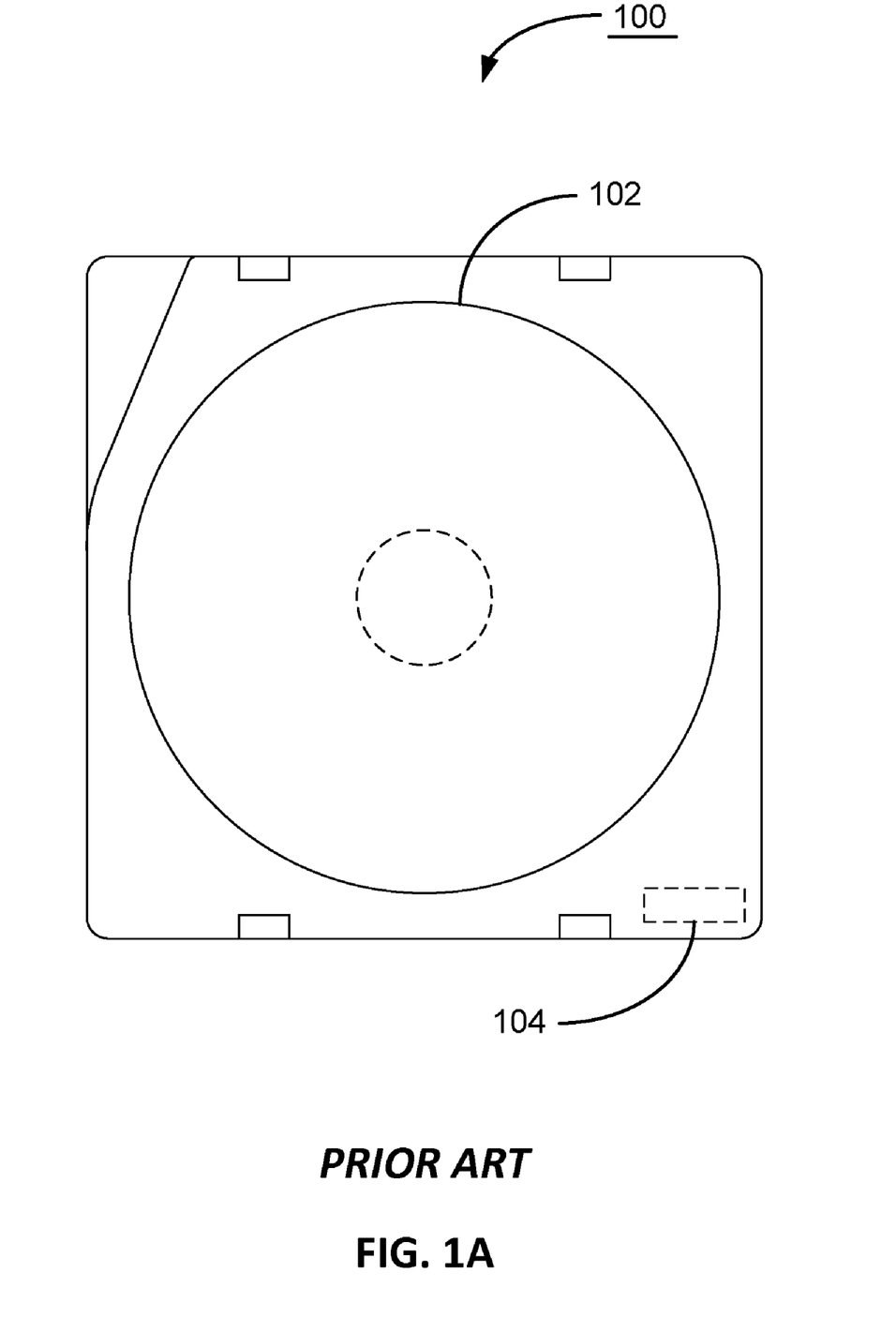
FIG. 1A is a pictorial representation of a prior art tape cartridge with an auxiliary radio frequency memory device.

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of obtaining cursory information about a specific tape cartridge without requiring a time-consuming media load and tape threading process to read the on-tape index file, techniques using holes arranged in patterns in the cartridge casing and later electrical pads grounded in a variety of combinations were introduced. The holes and/or electrical pads provided simple information such as tape capacity, manufacturer, etc. Today, these techniques are yielding to the introduction of Radio Frequency chips disposed in the tape cartridges called a Memory-In-Cartridge (MIC) or Medium Auxiliary Memory (MAM), because of increased amounts of information and ease of use. FIG. 1A shows an example of a tape cartridge 100, tape medium 102, and MIC 104, shown here in dashed lines because the MIC 104 and tape medium 102 reside in the interior of the cartridge 100. In this example, the MIC is disposed in an LTO-3 cartridge which can be provided by TDK Corp. of Tustin, Calif.

A MIC allows the tape drive to access valuable cartridge data without the use of a physical connection, reducing connector wear for both the drive and the media. The MIC is a memory chip built into the data cartridge that provides a direct and immediate connection to the drive's on-board processors, which speeds access to information related to the data cartridge such as system logs, for example. Information and file search parameters are formatted within the MIC system effectively cutting the data access time down to a fraction from historical techniques.

Figure 1B:
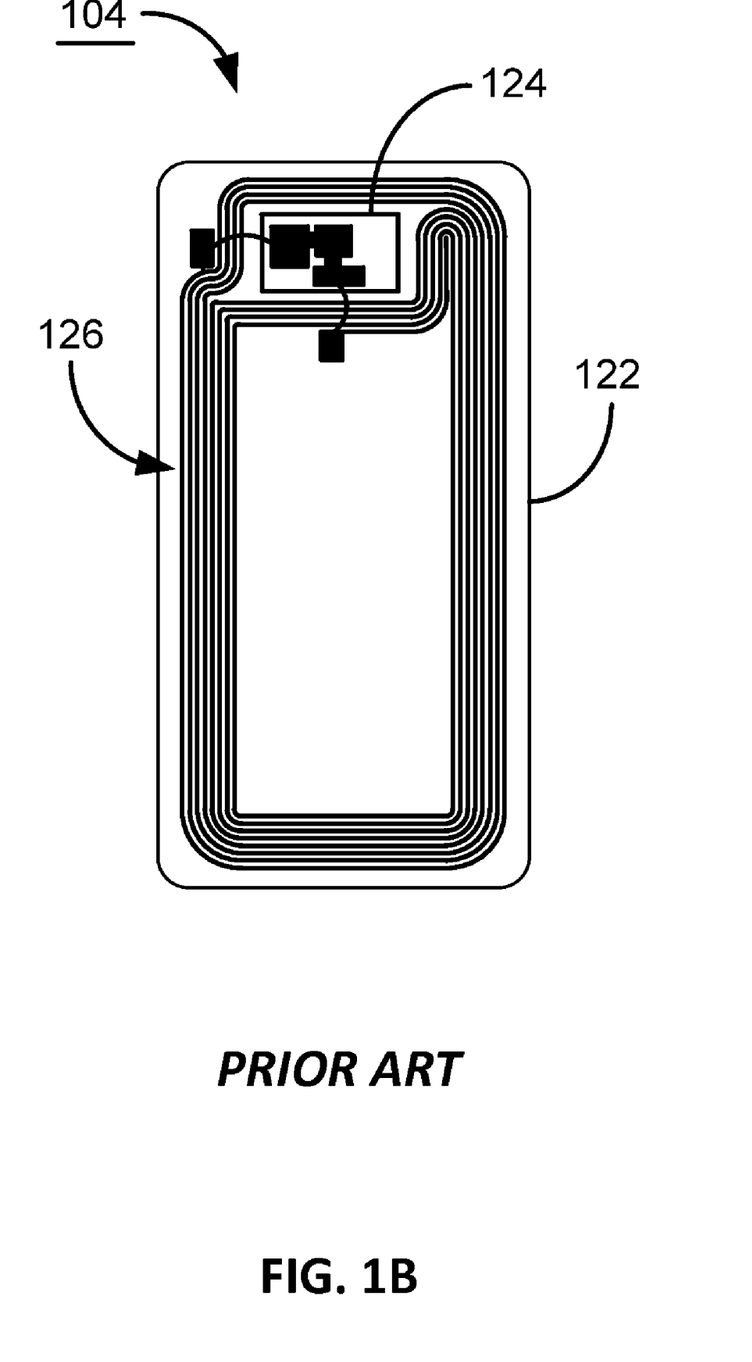
FIG. 1B is a pictorial representation of a prior art auxiliary radio frequency memory device.

As shown in FIG. 1B, a MIC 104 fundamentally comprises an integrated circuit that includes solid state memory and a transponder 124 attached to an antenna 126, which is typically a small coil of wires. The MIC 104 is considered a passive device because it is energized when subjected to a strong enough RF field produced by a MIC-Reader. Information can be transmitted between the MIC and the MIC-Reader via a specific radio frequency.

Currently a MIC, or MAM, is parceled into regions for a medium, device and host. The three regions can accommodate attributes related to a medium with a MIC. For example a medium attribute can be a serial number permanently stored in the MAM during manufacturing, a device attribute can be load count maintained by the tape drive, and a host attribute can be a backup date maintained by the application client. These attributes are strictly read and written to by a reader disposed in a drive.

In an effort to expand capabilities of a storage element containing a MIC operable with a data storage unit beyond a tape drive both methods and apparatus are disclosed herein. It is to innovations related to this subject matter that the claimed invention is generally directed.

SUMMARY OF THE INVENTION

The present invention relates generally to tape libraries using tape storage cartridges that contain medium auxiliary memory devices, which overcomes the disadvantages and limitations of the prior art by retaining a record of when a tape cartridge is loaded in a tape drive, the record being maintained by an associated medium auxiliary memory device. A method of using the tape library is also disclosed.

One embodiment of the present invention can therefore comprise a storage system having: a first tape drive; a first tape cartridge that possesses a medium auxiliary memory device, the medium auxiliary memory device maintaining a record of a previous access event wherein the access event is approximately a point in time when the first tape cartridge was loaded in the first tape drive; a medium auxiliary memory reader that is capable of reading the record; a timer in communication with the reader that determines how much time has elapsed from the access event.

Another embodiment of the present invention can therefore comprise a method comprising the steps of: loading a tape cartridge in a first tape drive to form a cooperating relationship; recording a first access event to a medium auxiliary memory device contained in the tape cartridge, the first access event is substantially a point in time when the tape cartridge was loaded in the first tape drive; reading the first access event from the medium auxiliary memory device; and determining how much time has elapsed from the first access event, the determining step occurs after the reading step.

In yet another embodiment of the present invention can therefore comprise a storage system including: a first tape drive; a tape cartridge that possesses a medium auxiliary memory device wherein the medium auxiliary memory device is contained in the tape cartridge; means for recording a first access event to the medium auxiliary memory device wherein the first access event is substantially a point in time when the tape cartridge was loaded in the first tape drive; means for reading the first access event from the medium auxiliary memory device; and means for determining how much time has elapsed from the first access event is accomplished after the reading step.

DETAILED DESCRIPTION

Figure 2A:
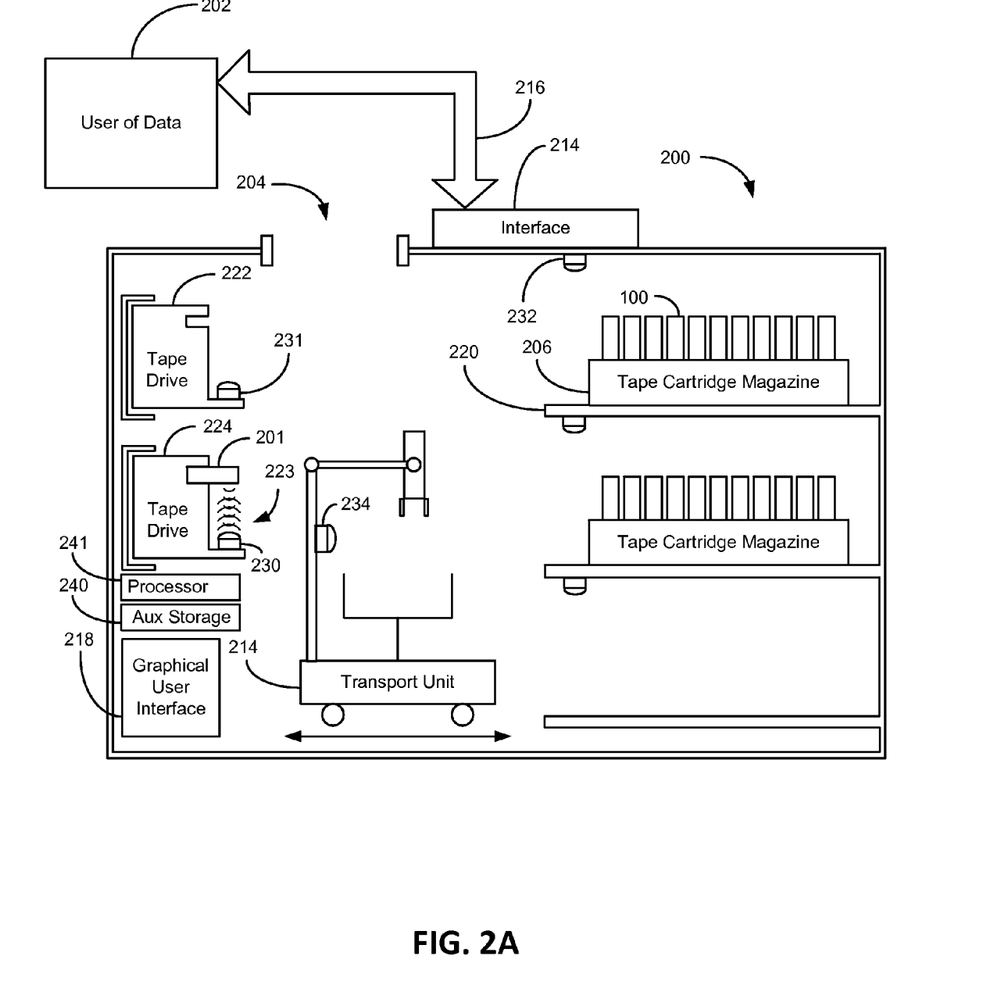
FIG. 2A is an illustration of a data storage arrangement constructed in accordance with an embodiment of the present invention.

Referring to the drawings in general, and more specifically to FIG. 2A, shown therein is an illustration of a data storage arrangement constructed in accordance with an embodiment of the present invention. In what follows, similar or identical structures may be identified using identical callouts.

The data storage arrangement illustrated in FIG. 2A can comprise a user of data 202, such as a client or host, in communication with a data storage library 200. As illustratively shown, the client 202 is in communication with the library 200 via a communication path 216 and the library interface device 214. The library 200 comprises a plurality of tape cartridges 100 disposed in a tape cartridge magazine 206 wherein each of the tape cartridges 100 contains an auxiliary radio frequency memory device (not shown), such as the Medium Auxiliary Memory (MAM) device 104 of FIG. 1B. The MAM device 104 is capable of retaining auxiliary digital data. In alternative embodiments, the tape cartridges 100 can be disposed on shelves instead of magazines 206, as will be discussed in conjunction with FIG. 3A-3C. A MAM device 104 associated with a tape cartridge, such as the cartridge 100 or 201, for example, may be identified throughout the detailed description as element 104 even though it is considered to be contained by a cartridge and may not be viewable in a specific figure exemplifying embodiments of the present invention. Thus, the identification of the MAM device as element 104 is for illustrative purposes herein. In this embodiment, the library 200 also comprises several tape drives 222 and 224, each capable of reading user data from and writing user data to one of the plurality of tape cartridges 100. User data herein is considered data from a source such as the user of data 202 that can be stored on the tape medium 102, such as depicted in FIG. 1A. Each tape drive 222 and 224 can be associated with a tape drive radio frequency memory device reader and writer 231 and 230, respectively as shown. A MAM device can be read by a MAM reader device, written to by a MAM writer device or read from and written to by a MAM reader and writer device. If a reader device needs only to read MAM information, then a writer device built with the reader device may not be necessary. Likewise, a writer device does not necessarily have to include a reader device. Though a MAM reader/writer device is used herein, there is no requirement that they must coexist. Each tape drive 222 and 224 is further capable of transmitting information to the MAM device 104, such as when an access event occurs (that is when a tape cartridge 100 is loaded in a tape drive 222 and 224), a specific host, such as the user of data 202, is associated with the load operation, and/or a specific tape drive is associated with the access event. In addition, load count can be tied to an access event and stored, as well, to a MAM device 104 via the tape drive MAM writer and reader device 230, for example. An example of an access event is when the tape cartridge 201 inserted in the tape drive 224 in a cooperating reading and writing relationship where user data can be stored and read from the tape medium 102 contained substantially by the cartridge 201. As shown here, the loaded tape drive 224 is also in radio frequency communication 223 with the MAM device 104, which in this embodiment is a medium auxiliary radio frequency memory device disposed in the tape cartridge 201, via the tape drive radio frequency memory reader and writer device 230 associated with tape drive 224. The tape drive 224 (as well as 222) is capable of transmitting the access event to the MAM device 104 associated with the tape cartridge 201 via the tape drive radio frequency memory device reader and writer 230. An access event is substantially a point in time when a tape cartridge is loaded in a tape drive. For example: an access event can be linked to a date and time when a tape is loaded in a tape drive; or an access event can be linked to just a date; an access event can be established by showing how much time has elapsed since a tape was loaded in a tape drive. The auxiliary storage location 240 can maintain a record of information, such as access event records, from a plurality of MAM devices 104 each of which is contained in an associated tape cartridge 100.

The library 200 can further comprise a shelving system 220 capable of archiving the tape cartridge magazines 206, or independent tapes 100, within the library 200. In this embodiment, the shelving system 220 is associated with at least one MAM device reader 232 that is at least capable of reading data, such as access event information, maintained (stored) by a MAM device 104. A transport unit 214 comprises a carriage or other means for transporting a tape cartridge magazine 206 from the shelf system 220 to a location that facilitates a tape cartridge 100 to be inserted in one of the drives 222 or 224, such as tape cartridge 201 in a cooperating relationship with drive 224, to read and write data as shown. An example of a means for transporting is a robotic device that moves along a rail system via a belt device, a motorized rack and pinion arrangement, a lead screw arrangement, a motor with wheels, etc. The transport device 214 can, in one embodiment, be associated with at least one MAM device reader and writer 234, as shown here. The library 200 also optionally comprises an entry/exit port 204 whereby tape cartridges 100 or tape cartridge magazines 206 can be transferred between an environment external to the library 200 and an environment internal to the library 200. The MAM device readers/writers 232 and 234 are independent of the tape drive MAM device reader 230 or 231, that is, devices 232 and 234 are disposed in a location independent of a tape drive and are not associated with a tape drive. In this embodiment, the library 200 can accommodate a graphical user interface 218 and an auxiliary memory 240, such as a disk drive, solid state memory device or other non-volatile memory device capable of retaining (storing) relevant information related to each tape 100, such as that which is stored on a MAM device 104. In an optional embodiment, the tape cartridges 100 or the tape cartridge magazines 206 may be associated with different users of data which can occur when the storage resources in the library 200 are divided into two or more partitions wherein each partition is associated with the different user of data, for example.

Figure 2B:
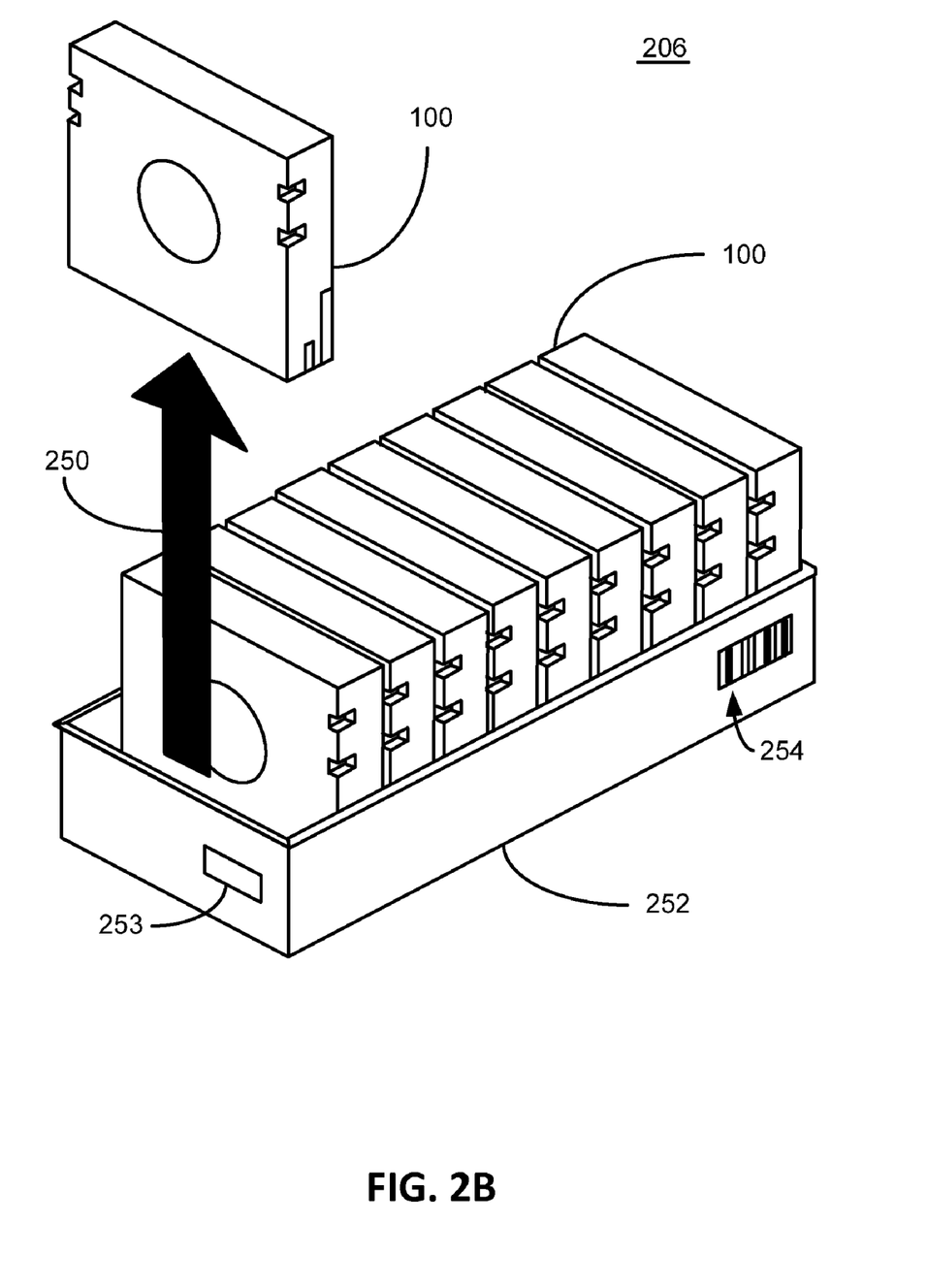
FIG. 2B is an illustration of a populated tape cartridge magazine in accordance with an embodiment of the present invention.

With reference to FIG. 2B, shown therein are tape cartridges 100 supported by a tape cartridge magazine 206. In more detail, a tape cartridge 100, such as an LTO-3 category tape cartridge, comprises magnetic tape that is capable of storing digital data written by a compatible drive 220 or 224, such as an LTO-3 tape drive manufactured by IBM, when in cooperation to read and write data (i.e. loaded) with the tape cartridge 201 as shown in FIG. 2A. The tape cartridge magazine 206 is shown populated with a plurality of tape cartridges

100. A tape cartridge 100 can be removed from the tape cartridge magazine 206, as shown by the arrow 250, and inserted in to the tape drive 220 or 224 by means of a picker device 502, shown in FIG. 5. Disposed on the tape cartridge magazine 252 is a bar code identifier 254 for identifying the tape cartridge magazine 206 which has utility should the tape cartridge magazine 206 be archived in a media pack storage vault that is remote from a library, for example. In this embodiment, all tape cartridges 100 contain a MAM device 104, however, in alternative embodiments, some tape cartridges may not contain a MAM device 104. In another embodiment of the present invention, the magazine 206 can comprise a magazine auxiliary memory device 253 that is capable of containing information from at least one of the data cartridges 100 the magazine 252 supports. The magazine auxiliary memory device 253 can receive information that is maintained on the MAM devices 104 contained by each tape cartridge 100 via one or more MAM device readers/writers 232 or 234, for example. Information from the MAM devices 104 can be read and immediately transmitted to the magazine auxiliary memory device 253, or alternatively, the information of each MAM device 104 can be stored on the auxiliary storage device 240 and then transferred to the magazine auxiliary memory device 253, just to name two examples. In one embodiment, the magazine auxiliary memory device 253 can possess access events of every tape cartridge 100 associated with the magazine 206, which can serve a redundancy to the auxiliary storage device 240, of FIG. 2A.

A MAM device 104, in one embodiment, is parceled into three regions in which data can be stored; a medium device region which contains information such as a serial number, a device region which contains information from the tape drive such as load count, and host/vendor unique region wherein information such as history and/or performance data related to the cartridge 100 can be stored. The information in the regions can be added to with new information via an address related to the arrangement of available storage space in the MAM device 104 or, optionally, the information can be read by an auxiliary memory reader, such as the reader 230, and reassembled with additional information and stored on the MAM device 104 as the reassembled version, just to name two examples. In another example, if the storage limit is reached in the MAM device 104, such as the host/vendor data in the host/vendor unique region, the host/vendor data can be read and stored in an auxiliary storage space, such as the auxiliary memory 240, and the host/vendor unique region purged and made available for new information. In another example, the host/vendor data can be compressed with algorithms to decompress residing in the library 200 or user of data 202, for example.

Figure 3A:
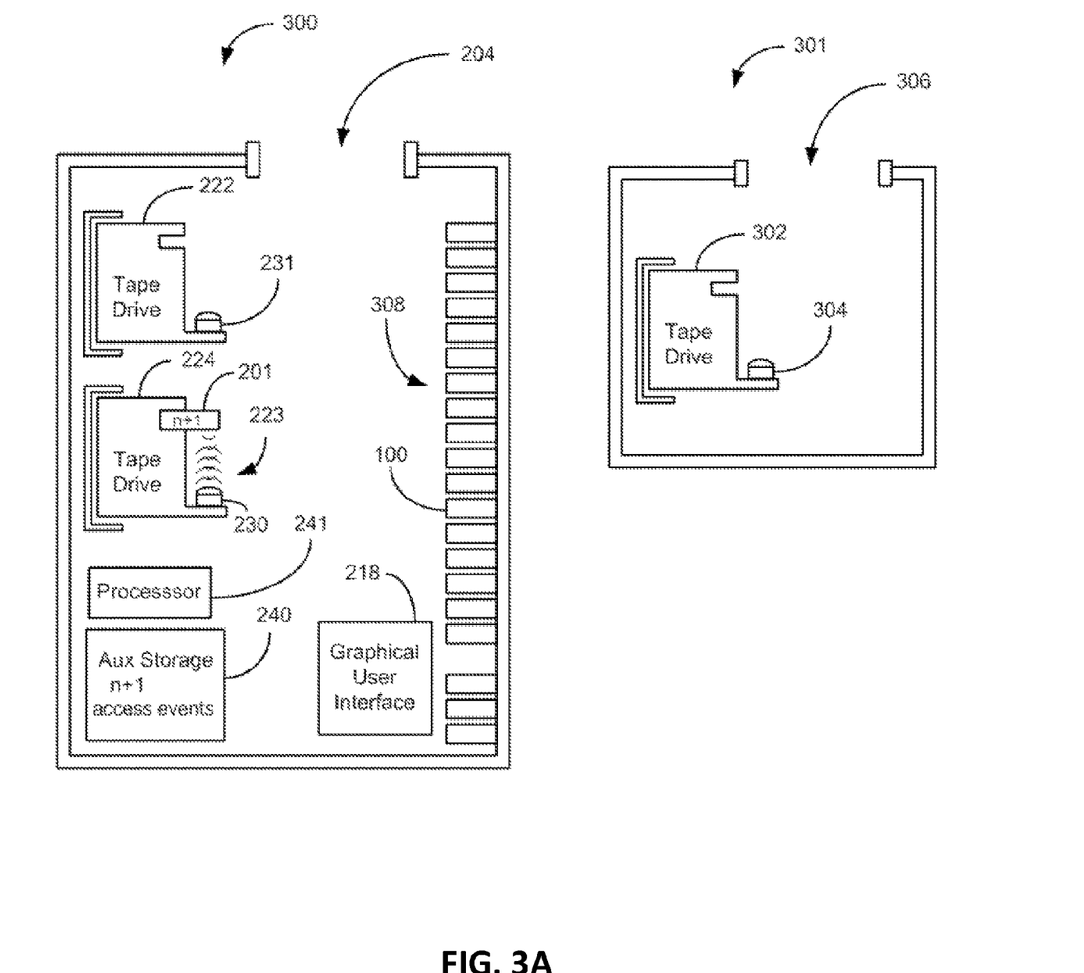
FIG. 3A-3C are illustrations of an embodiment of a tape cartridge with a MAM device being loaded in multiple tape drives in multiple libraries in accordance with embodiments of the present invention.

With reference to FIG. 3A, shown therein is an illustration of a first tape library 300 and a second tape library 301 possessing a tape drive 302 according to some embodiments of the present invention. As shown, the first tape library 300 comprises a tape cartridge 201 that is loaded in the tape drive 224. The tape cartridge 201 possesses a MAM device 104. The first tape drive 224 possesses a MAM reader and writer device 230. The library 300 also possesses a second tape drive 222 with an associated MAM reader and writer device 231. The second tape drive 222 is not currently loaded with a tape cartridge 100. The library 300 also comprises a processing device 241 that is communicatively linked to both of the first and second tape drives 224 and 222 respectively and the auxiliary storage device 240. The first library 300 also possesses a graphical user interface 218 communicatively linked to the processor device 241 and, in one embodiment the auxiliary storage device 240. The first library 300 also provides a shelf system 308 wherein tape cartridges 100 are moveably disposed.

As illustratively shown, the tape cartridge 201 is loaded in the tape drive 224 and the tape drive's MAM reader and writer device 230 is transmitting a radio frequency transmission 223 of the approximate point in time of the access event. In other words, a record is stored on and maintained by the MAM device 104 associated with the tape cartridge 201 of the approximate when the tape cartridge 201 has been accessed, by an end user 202, for example. The act of loading the tape cartridge 201 in the tape drive 224 initiates a sequence of steps to lock the tape cartridge 201 in place, thread the associated tape medium in the drive 224, etc. One of the steps in the loading sequence can include activating the MAM reader and writer device 230, to assess the point in time of the loading sequence using a clock, or timer, as a reference in time (such as the clock associated with a computer in the first library 300) and transmitting that information as the access record to the MAM device 104. At any time, a program running on the processor 241 is operable to determine how much time has elapsed from when the tape cartridge access event took place relative to that described in FIG. 3A. In one embodiment, the processor 241 has access to a clock device that compares the present time to the point in time recorded on the MAM device 104 to assess how much time has elapsed from approximately when the access event occurred. The amount of time from the access event can be displayed on the Graphical User Interface 218 or to a user of data 202, to a printer, to a program for analysis that may take action based on the analysis, just to name several examples.

In an optional embodiment, when a tape cartridge 100 is newly introduced to the library 300 a record of the new tape cartridge 100 and its associated tape cartridge identification, such as a bar code, is logged into a library memory device 240, such as the auxiliary storage device 240, for example. Any related data maintained by the MAM device 104 associated with the newly introduced tape cartridge 100 is downloaded to the library memory device 240.

Figure 3B:
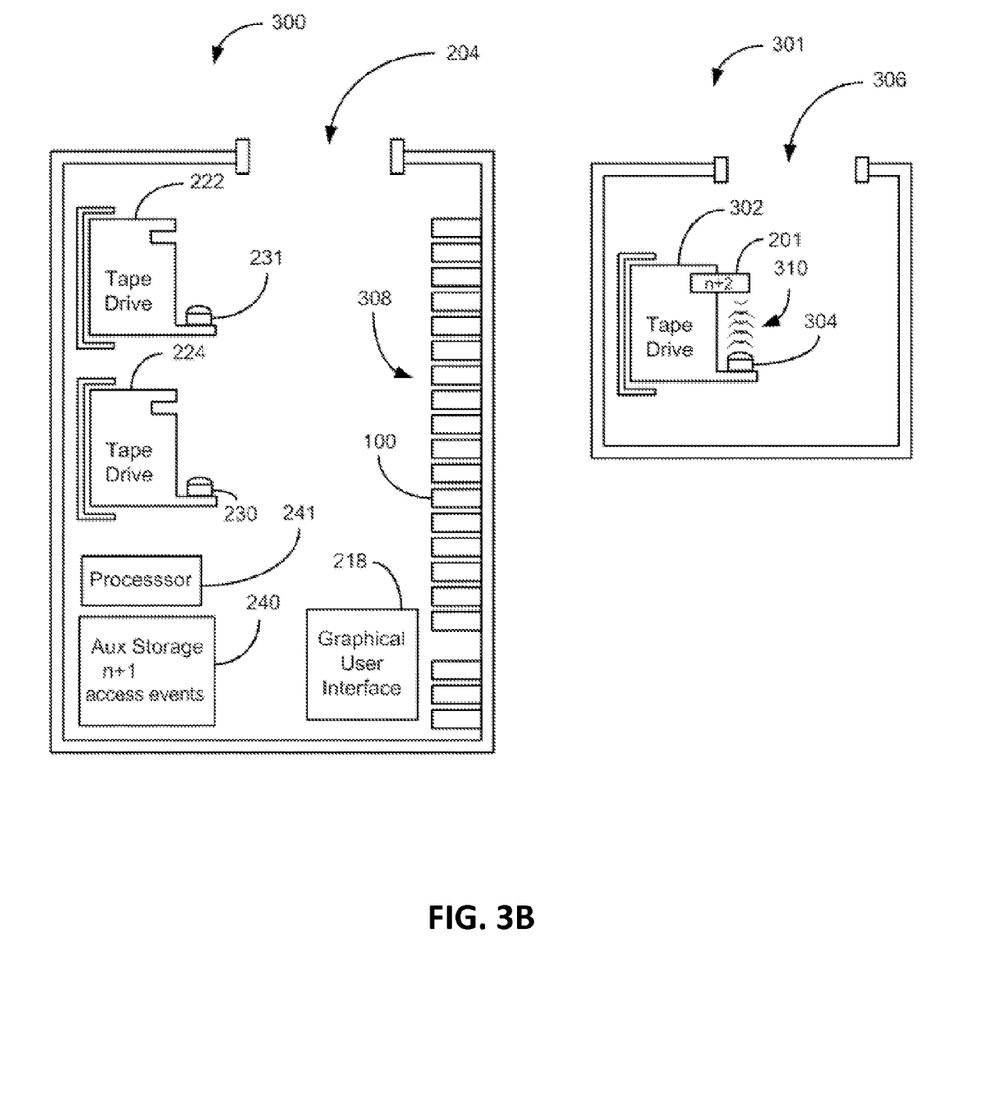

With reference to FIG. 3B, shown therein is the first library 300 and second library 301, the tape cartridge 201 being located in the second library 301. The tape cartridge 201 can be introduced to the second library 301 via the entry/exit port 306. As illustratively shown, the tape cartridge 201 is loaded in the tape drive 302, the MAM reader and writer device 304 is shown transmitting the approximate point in time of a second access event (n+2) to the tape cartridge 201 via an RF signal 310. In one embodiment, a record of the second access event can be cumulative with the first access event; that is, the record of the access event from FIG. 3A (n+1) and (n+2) coexist in the MAM device 104. In an alternative embodiment, the record of the second access event (n+2) replaces the record of the first access event (n+1). In this alternative embodiment, limited storage space on the MAM device 104 can be managed. In yet another alternative embodiment, the first record (n+1) is transmitted to non-volatile memory external to the MAM device 104 where it is maintained and can be recalled prior to replacing the first record (n+1) with the second record (n+2). In yet another alternative embodiment, a record of the second access event (n+2) is transmitted to the first library 300 and stored in the auxiliary storage device 240.

Figure 3C:
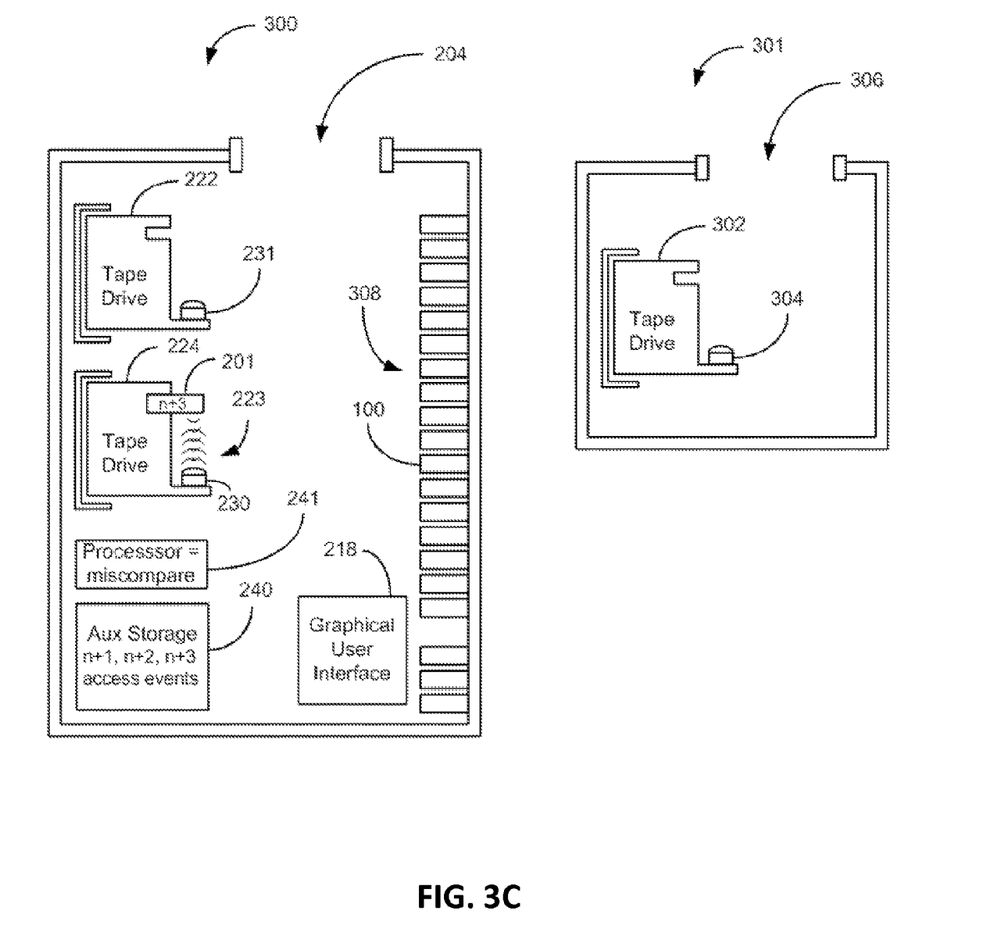

FIG. 3C shows the tape cartridge 201, once again, located in the first tape library 300. As illustratively shown, the tape cartridge 201 is loaded in the tape drive 224 and the tape drive's MAM reader and writer device 230 is transmitting a radio frequency transmission 223 of the approximate point in time of the third access event (n+3). At any time, the program running on the processor 241 is operable to determine how much time has elapsed from when any of the first, second or third access events took place. In an optional embodiment, the auxiliary storage device 240 receives a record of the second access event (n+2) from the MAM device 104 when the tape cartridge 201 is loaded in the tape drive during the third access event (n+3). In this optional embodiment, the tape drive MAM reader and writer device 230 receives information pertaining to the second access event (n+2) from the MAM device 104 when loaded in the tape drive 224. The first library 300 can then make an assessment of elapsed time from when the second access event (n+2) occurred. Optionally, a record of the second access event (n+2) is read from a MAM reader device that is independent of a tape drive and transferred to the auxiliary storage device 240. In one embodiment, the processor 241 has access to a timer, such as a clock device, that compares the present time to the point in time recorded on the MAM device 104 to assess how much time has elapsed from any given record of an access event. The timer is in communication with the tape drive MAM reader and writer device 230 (or any other MAM reader and writer device).

Figure 4:
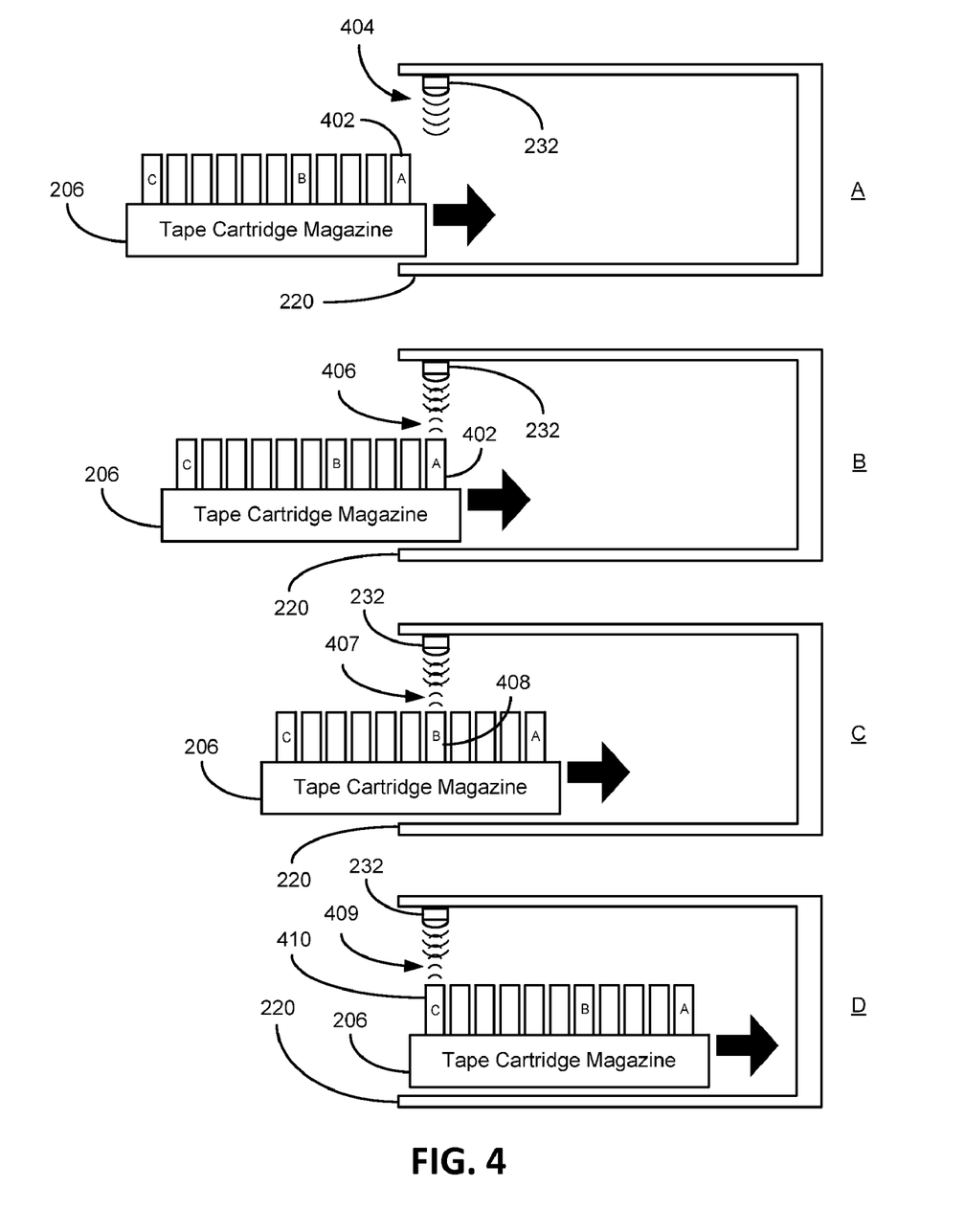
FIG. 4 is an illustration of a transport unit and auxiliary memory reader arrangement in accordance with an embodiment of the present invention.

FIG. 4 illustrates an embodiment of a shelf system 220 comprising an auxiliary memory reader 232, independent from any tape drive, which can be used in combination with a loaded tape cartridge magazine 206. As illustratively shown in arrangement A, the tape cartridge magazine 206 is in the process of being moved on to the shelf 220 in the direction of the arrow. The auxiliary memory reader 232 is shown transmitting an RF field 404 via an auxiliary radio frequency memory device 104 contained in cartridge A 402. Arrangement B illustrates the MAM device 104 contained in tape cartridge A 302 transmitting data, such as access event information relative the history of loads associated with cartridge A 402, in the form of an RF signal 406 to the auxiliary memory reader 232 when positioned in the presence of the RF field 404. In one embodiment of the present invention, the MAM device 104 is a passive device because it is energized when subjected to a strong enough RF field produced by the auxiliary memory reader 232. Information is transmitted between the MAM device 104 and the auxiliary memory reader and writer device 232 via a specific radio frequency, shown here as 404 and 406. Data can be transferred to and stored on the MAM device 104 from the library 200 or alternatively (and in addition thereto) data from the MAM device 104 can be transferred to and stored in the auxiliary memory 240 via the auxiliary memory reader/writer device 232. Arrangement C illustrates the MAM device 104 contained in tape cartridge B 408 transmitting data in the form of an RF signal 407 to the auxiliary memory reader/writer device 232 when positioned in the presence of the RF field 404. Arrangement D illustrates the MAM device 104 contained in tape cartridge C 410 transmitting data in the form of an RF signal 409 to the auxiliary memory reader 232 when positioned in the presence of the RF field 404. Access event information can be further stored on a magazine auxiliary memory device 253, of FIG. 2B, for every cartridge 100 populated in the magazine 206. In an optional embodiment, the auxiliary memory reader 232 can be linked with the processor device 241 and the auxiliary storage device 240, thus, providing access event information to be compared with that retained on the MAM device 104 and the auxiliary storage device 240, described in FIG. 3C. A comparison can be a check option to make sure that the access event data is consistent between the MAM device 104 and the auxiliary storage device 240.

Figure 5:
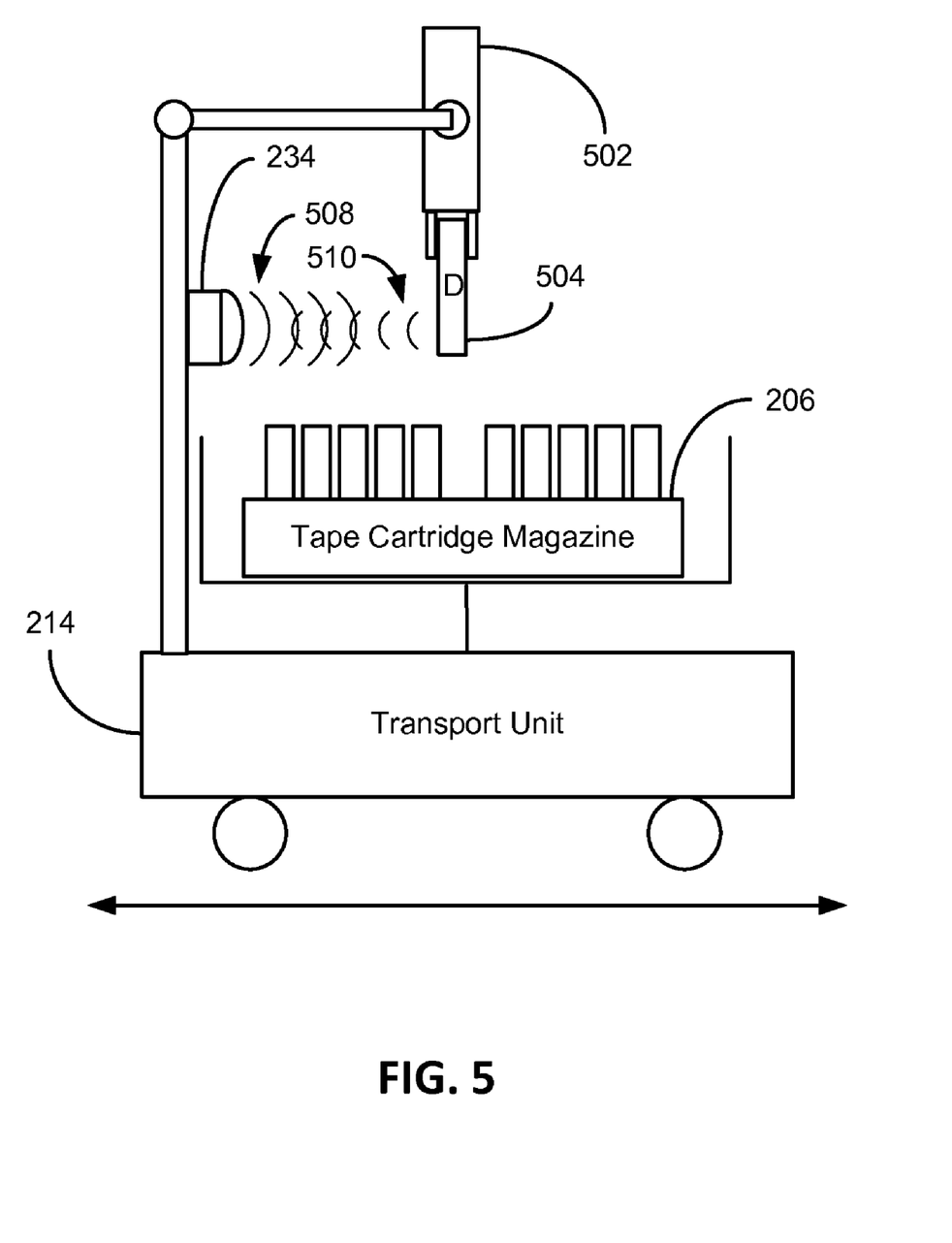
FIG. 5 shows an embodiment of an auxiliary radio frequency memory device reader located at the library entry/exit port location consistent with embodiments of the present invention.

With reference to FIG. 5, shown therein is an illustration of the transport unit 214, of FIG. 2A, in greater detail. The transport unit 214 is adapted to transport tape cartridge magazines 206 within the library 200. A cartridge picker 502, which can be associated with the transport unit 214, is adapted to move cartridges 100 from a tape cartridge magazine 206 into a cooperating read/write relationship with a tape drive, such as tape drive 224 of FIG. 2A. The transport unit 214 is illustratively shown herein accommodating an auxiliary memory reader 234 that is transmitting an RF signal 508 (and potentially data) to the MAM device 104 contained in tape cartridge D 504 whereby the MAM device 104 of cartridge D 504 is transmitting data, such as access event information, via an RF signal 510 to the auxiliary memory reader 234. In an optional embodiment, the auxiliary memory writer/reader 234 can be linked with the processor device 241 and the auxiliary storage device 240, thus, providing access event information that can be used as an alternative to the auxiliary memory device reader and writer 230 described in FIG. 3C. In this optional embodiment, the mere activity of the picker accessing the data cartridge is enough to record an access event. For example, when the picker 502 is instructed to grasp cartridge D 504, the auxiliary memory writer/reader 234 is activated by a library controller that has knowledge of the instruction and the access information is transferred to MAM device 104 in cartridge D 504 when grasped. Furthermore, in yet another optional embodiment, the MAM device 104 in cartridge D 504 can be made to retain the access event tied to being accessed by the picker 502, such as if there is more than one picker in a library, for example.

Figure 6:
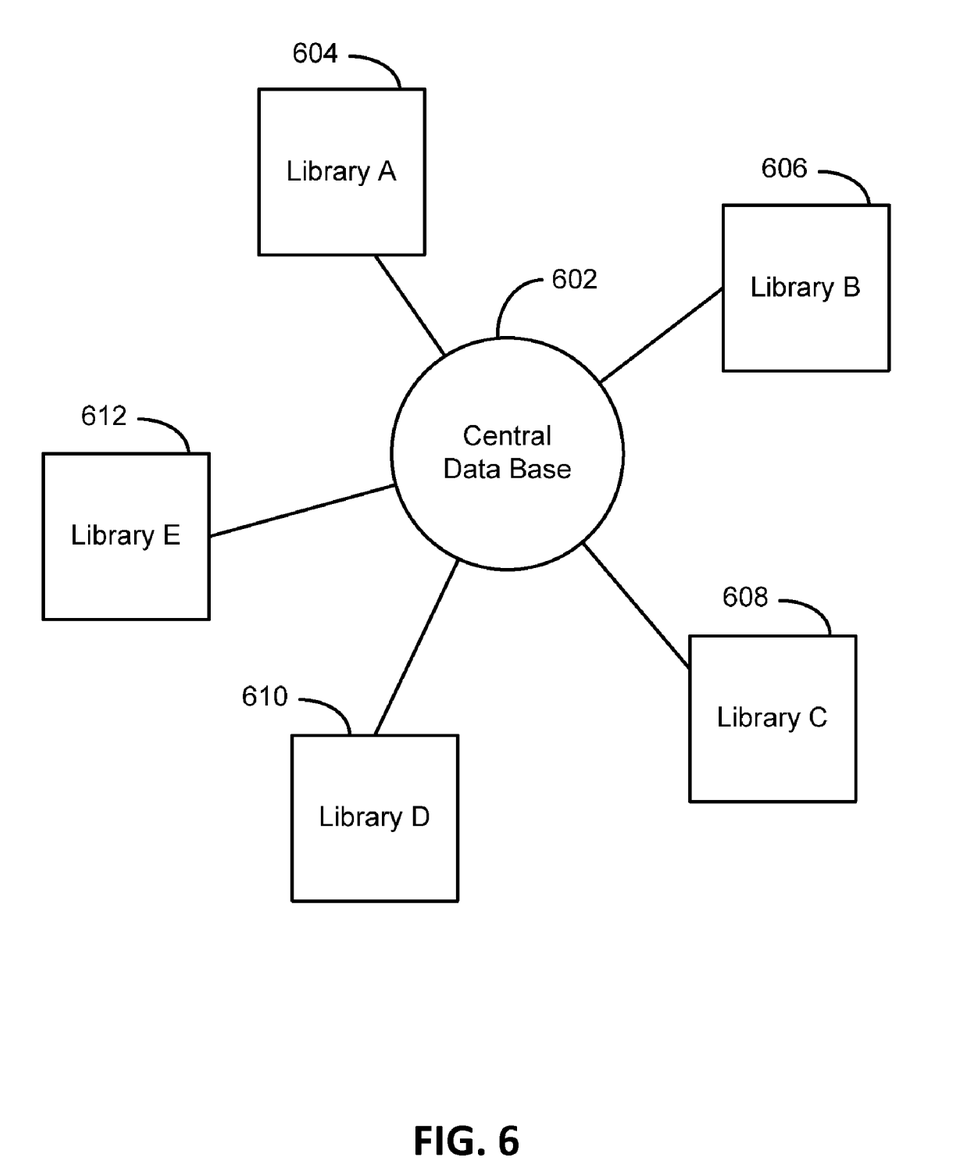
FIG. 6 is a block diagram illustrating a central data base acting as a repository for information pertaining to a plurality of tape cartridges in a plurality of libraries in accordance with an embodiment of the present invention.

FIG. 6 is a block diagram illustrating a central data base 602 acting as a repository for information pertaining to access events for at least each tape cartridge associated with libraries A-E 604-612. As shown in the illustrative arrangement, library A 604, B 606, C 608, D 610 and E 612 are each linked to the central data base 602. The central data base 602 can provide storage of any, and all, auxiliary radio frequency memory device information, including all access events associated with each of the tapes 100 in each of the libraries A-E 604-612, that can be contained in each tape cartridge associated with each library A-E 604-612. The central data base 602 can provide the function of the processor device 241 and auxiliary storage device 240 from FIGS. 3A-3C, thus generating a user specified action if the time from an access event exceeds a predetermined limit within any of the libraries A-E 604-612. A user specified action may alert a user that data on the tape cartridge is no longer useful or must be refreshed (i.e., re-written), for example. The auxiliary radio frequency memory device information stored on the central data base can be viewed by an authority, in one embodiment, such as an Original Equipment Manufacturer of libraries and/or tapes, for purposes of tape management.

Figure 7:
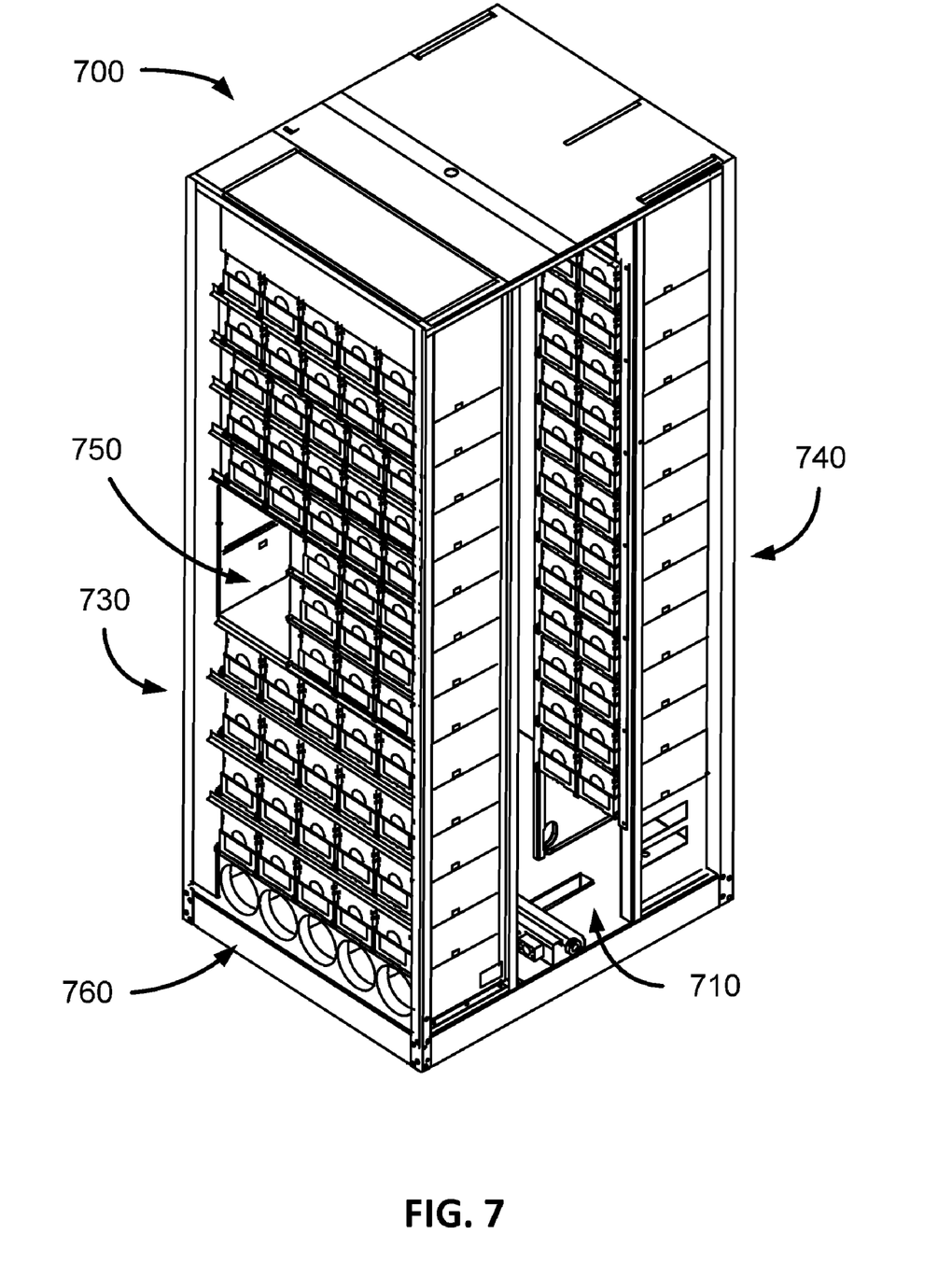
FIG. 7 shows a commercial embodiment of one T-950 library unit wherein aspects of the present invention can be practiced.

Embodiments of the present invention can be commercially practiced in a Spectra Logic T-950 tape cartridge library manufactured by Spectra Logic of Boulder Colo. FIG. 7 shows a commercial embodiment of one T-950 library unit 700 without an enclosure. The T-950 library 700 comprises a first and second shelf system 730 and 740 that are adapted to support a plurality of the mobile media, such as the tape cartridge magazine 206 comprising a plurality of LTO-3 tape cartridges with MAMs, archived by the library 700. The shelf systems 730 and 740 can each comprise at least one auxiliary memory reader, such as the auxiliary memory reader 232 of FIG. 2A. Disposed next to the second shelf system 740 are at least four IBM LTO-3 drives adapted to read and write data to and from a tape cartridge. The IBM LTO-3 drives each have the capability of storing data to an auxiliary radio frequency memory device 104 contained in an LTO-3 cartridge. Functionally interposed between the first and second shelf system 730 and 740 is a magazine transport space 710. The magazine transport space 710 is adapted to provide adequate space for a tape cartridge magazine 206 to be moved, via a magazine transport and cartridge picker (not shown), from a position in the first shelf system 730, for example, to a drive. The magazine transport and picker can further accommodate at least one auxiliary radio frequency memory device reader, such as the reader 234 from FIG. 2A. Tape cartridge magazines 206 can be transferred into and out from the T-950 library 700 via an entry/exit port 750. Transferring tape cartridge magazines 206 in and out of the T-950 library 700 can be accomplished by an operator, for example. The T-950 library 700 comprises cooling fans 760, located at the base of the library 700. The T-950 library 700 can be linked to a central data base, such as the data base 602, wherein the central data base can provide storage of all of the auxiliary radio frequency memory devices, such as the MAM device 104, contained in each tape cartridge in the T-950 library 700 as read by any one of the auxiliary radio frequency memory device readers. The T-950 library also comprises a library controller (not shown) that can function as the processor device 241 in addition to an auxiliary storage device 240, such as a disk drive (or plurality of disk drives), of FIGS. 3A-3C. The T-950 library 700 also provides a graphical user interface (not shown) whereon a display of access event data, or in an alternative embodiment, simple messages pertaining to a user specified action associated with a tape cartridge can be displayed, such as an alert to refresh or remove data on a specific tape cartridge, for example.

Figure 8:
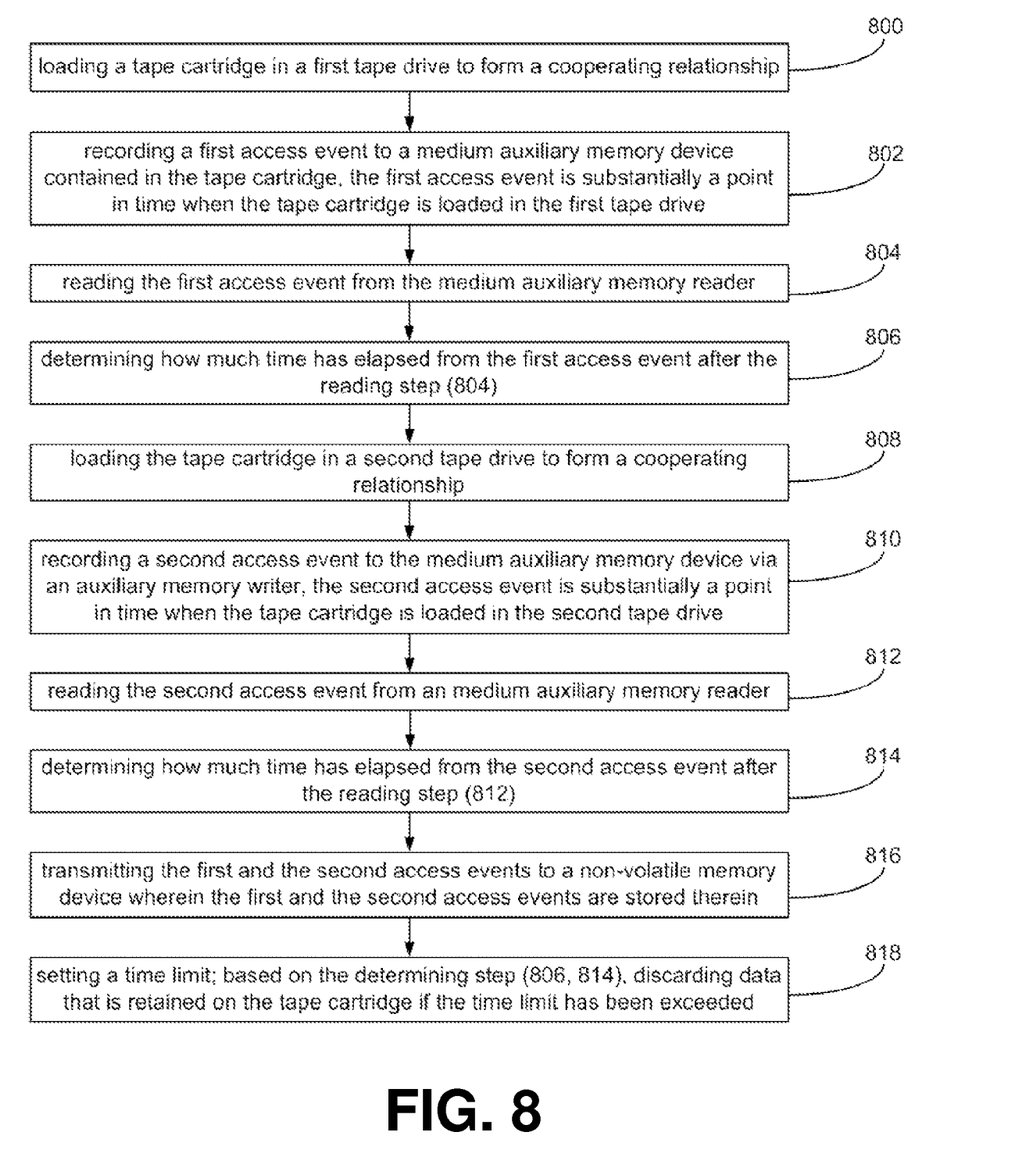
FIG. 8 is a block diagram illustrating a method to practice an embodiment of the present invention.

Referring now to FIG. 8 in conjunction with the preceding FIGS, shown therein is a method to practice an embodiment of the present invention. It should be recognized that the steps presented in the described embodiments of the present invention do not necessarily require any particular sequence unless otherwise stated. As shown in step 800 and in conjunction with FIG. 3A, a tape cartridge 201 is loaded in a first tape drive 224 to form a cooperating relationship. For purposes of illustration, step 800 can be accomplished in the first library 300. Step 802 is a step of recording a first access event (n+1) to a MAM device 104 contained in the tape cartridge 201 via an auxiliary memory writer. The first access event is substantially a point in time when the tape cartridge 201 is loaded in the first tape drive 224. A means for recording the first access event can be accomplished by the first tape drive's auxiliary memory writer device 230, or optionally an auxiliary memory writer device that is independent from the first tape drive 224, such as the second tape drive's auxiliary memory writer device 231, an auxiliary memory writer device 234 associated with a cartridge picker 502, or some other memory writer device not associated with a tape drive. Step 804 is a step of reading the first access event (n+1) from a medium auxiliary memory reader. The notation (n) refers to the number of access events that may have occurred prior to the current access event. A means for reading the first access event (n+1) can include the tape drive MAM device reader 230 or 231 or 304, the shelf MAM device readers 232, the picker MAM device reader 234, or other MAM device readers that could be disposed in various locations within or outside of a library. Step 806 is a step of determining how much time has elapsed from the first access event (n+1) after the reading step 804. A means for determining how much time has elapsed from the first access event (n+1) can be accomplished via a program that runs on a processor device 241, or computer system, that has access to the record of the first access event (n+1). The program accesses the record of the first access event (n+1) either from a MAM reader device or from non-volatile storage, such as the library's auxiliary storage device 240, and compares that record of when the access event occurred against the known current time.

In an optional embodiment, the method can further include step 808 of loading the tape cartridge 201 in a second tape drive 302 to form a cooperating relationship, as illustrated in FIG. 3B. The second drive 302 need not be in the second library 301, but could also be the second drive 222 in the first library 300. Step 810 is a step of recording a second access event (n+2) to the medium auxiliary memory device 104 via an auxiliary memory writer 304, for example. The second access event (n+2) is substantially a point in time when the tape cartridge 201 is loaded in the second tape drive 302. Step 812 is a step of reading the second access event (n+2) from the MAM device 104 which can be accomplished a via a variety of reader embodiments. Step 814 is a step for determining how much time has elapsed from the second access event (n+2) after the reading step 812. In an optional embodiment, step 816 is the step of comprising transmitting the first access event (n+1) and the second access event (n+2) to a non-volatile memory device, such as the auxiliary storage device 240, that stores the first access event (n+1) and the second access event (n+2) therein. Step 818 shows yet another optional embodiment of setting a time limit that is based on the determining step 806, and discarding data that is retained on the tape cartridge 201 if the time limit has been exceeded. The time limit can be set by an operator, or user of data, for any number of reasons including an alert that after a predetermined amount of time, the data is considered old and should be refreshed or discarded due to obsolescence.

A user of data can then use that information to manipulate the expired data on the tape cartridge 201 according to the user's needs or wants. A user of data can use the information associated with the access event in conjunction with a load count. For example, if the load count exceeds a threshold of maximum number of loads and the most recent access event has not surpassed a time threshold, then the data from the tape cartridge may be transferred to another tape cartridge for preservation purposes. If, however, both the load count and the most recent access event have exceeded their respective limits, then the tape and the data thereon may be discarded. This is just one example of how one may use an access event in conjunction with load count.

In an optional embodiment, an access event can include identification of the tape drive with which it engaged in the access event. This record of the drive serial number (or other indicia) tied with the record of an associated access event can be manipulated for use by an end user. Other history, such as the particular host that was associated with any given loading step can provide a more complete story of any particular access event.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple auxiliary memory reader devices independent of a tape drive can be used inside of a library with one or more tape cartridge's associated auxiliary memory device at the same time while still maintaining substantially the same functionality relative access events and interaction with the auxiliary memory device 240 without departing from the scope and spirit of the present invention. Another example can include how access event information or a combination of access event information and host identification, drive identification or other can be used by an end user; the possibilities are extensive. Another example can include using auxiliary memory reader devices independent of a tape drive to check the accuracy of data via redundancy, not to mention techniques in which data from multiple tape cartridges, via their associated auxiliary memory devices, can be accumulated coincidentally, just to name a few examples, while still maintaining substantially the same functionality without departing from the scope and spirit of the present invention. Further, though elements and methods are described herein exemplifying a first and second object or element, for example, this language is used herein to simplify the description indicative of a plurality of objects or elements. Finally, although the preferred embodiments described herein are directed to tape library systems, RF devices, tape drives and related technology, it will be appreciated by those skilled in the art that the teachings of the present invention can be applied to other remote communication systems and devices, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage system comprising:
   a first tape drive;
   a first tape cartridge that possesses a medium auxiliary memory device, said medium auxiliary memory device maintaining a record of a previous access event wherein said access event is approximately a point in time when said first tape cartridge was loaded in said first tape drive;
   a medium auxiliary memory reader that is capable of reading said record;
   a timer in communication with said reader that determines how much time has elapsed from said access event.

2. The storage system of claim 1 wherein said medium auxiliary memory device maintains a second record of a second access event that precedes said previous access event.

3. The storage system of claim 1 further comprising a storage device that maintains a record of every access event encountered by said first tape cartridge, said encounter is with either said first tape drive or a different tape drive.

4. The storage system of claim 1 wherein said medium auxiliary memory device further maintains a plurality of other access events from when said first tape cartridge is loaded on other occasions in either said first tape drive or at least another tape drive, and a means for accessing all of said access events.

5. The storage system of claim 1 wherein the previous access event is one of a plurality of access events, when said plurality of access events reaches a predetermined number of access events then all user data retained by said first tape cartridge is transferred to a second tape cartridge.

6. The storage system of claim 5 wherein the second tape cartridge replaces said first tape cartridge in said library.

7. The storage system of claim 1 wherein when said elapsed time reaches a predetermined amount of time, then all user data retained by said first tape cartridge is transferred to a second tape cartridge.

8. The storage system of claim 1 wherein when said elapsed time reaches a predetermined amount of time, then all user data retained by said first tape cartridge is refreshed by restoring to said first tape cartridge.

9. A method comprising:
   loading a tape cartridge in a first tape drive to form a cooperating relationship;
   recording a first access event to a medium auxiliary memory device contained in said tape cartridge, said first access event is substantially a point in time when said tape cartridge was loaded in said first tape drive for a first time;
   reading said first access event from said medium auxiliary memory device; and
   determining how much time has elapsed from said first access event, said determining step occurs after said reading step;
   replacing user data retained by said tape cartridge when said elapsed time exceeds said predetermined amount of elapsed time.

10. The method of claim 9 wherein said first access event includes identification associated with said first tape drive.

11. The method of claim 9 further comprising transmitting said first second access event to a non-volatile memory device wherein said first access event is stored therein.

12. The method of claim 9 further comprising resetting a new point time when said replacing step is done.

13. The method of claim 9 wherein said tape cartridge contains a tape medium and said tape medium is devoid of said access event.

14. The method of claim 9 further comprising using said access event in conjunction with a load count.

15. The method of claim 9 wherein prior to replacing said user data, alerting an end user that said elapsed time has reached a predetermined amount of elapsed time.

16. The method of claim 9 wherein replacing said user data is accomplished by recording all of said user data on a new tape cartridge.

17. The method of claim 9 wherein replacing said user data is accomplished by rewriting all of said user data to said tape cartridge.

18. The method of claim 9 wherein said tape cartridge contains a tape medium and said tape medium contains said access event.

19. A method comprising:
   loading a tape cartridge in a first tape drive to form a cooperating relationship;
   recording an access event to a medium auxiliary memory device possessed by said tape cartridge wherein said medium auxiliary memory device possesses a plurality of other access events;
   determining that said access event and said plurality of other access events reaches a predetermined number of access events;
   replacing user data retained by said tape cartridge after said determining step.

20. The method of claim 19 wherein replacing said user data is accomplished by recording said user data on a new tape cartridge.

21. The method of claim 19 wherein prior to replacing said user data, alerting an end user that said predetermined number of access events has been reached.

* * * * *